United States Patent [19]

Middelbeek

[11] 4,202,778
[45] May 13, 1980

[54] SEPARATING DEVICE

[75] Inventor: Cornelis G. Middelbeek, Nootdorp, Netherlands

[73] Assignees: Ballast-Nedam Groep N.V., Amstelveen; Skimovex B.V, Utrecht, both of Netherlands

[21] Appl. No.: 955,629

[22] Filed: Oct. 30, 1978

[30] Foreign Application Priority Data

Oct. 31, 1977 [NL] Netherlands ............... 7711963

[51] Int. Cl.² ............................................. B01D 21/00
[52] U.S. Cl. ............................ 210/522; 210/532 R; 210/539
[58] Field of Search ............ 210/521, 522, 532 R, 210/533–537, 538–540, DIG. 5

[56] References Cited

U.S. PATENT DOCUMENTS

| | | | |
|---|---|---|---|
| 3,849,311 | 11/1974 | Jakubek | 210/521 |
| 4,064,054 | 12/1977 | Anderson et al. | 210/DIG. 5 |
| 4,123,365 | 10/1978 | Middelbeek | 210/521 |

FOREIGN PATENT DOCUMENTS

| | | | |
|---|---|---|---|
| 2273770 | 1/1976 | France | 210/522 |
| 7606200 | 12/1977 | Netherlands | 210/DIG. 5 |

Primary Examiner—Benoit Castel
Attorney, Agent, or Firm—John P. Snyder

[57] ABSTRACT

A separating device for separating by gravitational segregation a mixture of a carrier liquid and substances suspended therein comprises a separator arranged in a separator housing and having parallel, sloping plates, a stilling space arranged in front of said separator and having on the top side a first collecting space intended for light-weight substances, a feeding space near the inlet side of the separator, a second collecting space near the top wall and a third collecting space arranged behind the separator.

The separator housing is constructed as a pressure vessel and the first and second collecting spaces communicate with one another through a conduit, the flow resistance of which exceeds that of the separator.

5 Claims, 4 Drawing Figures

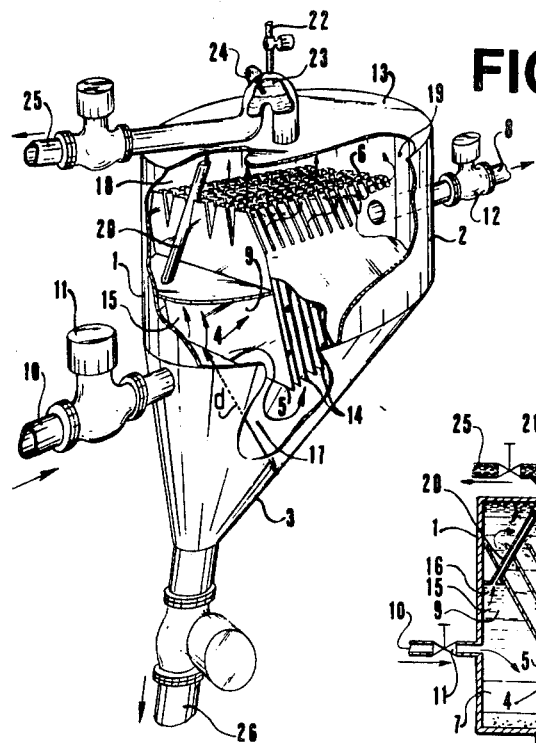
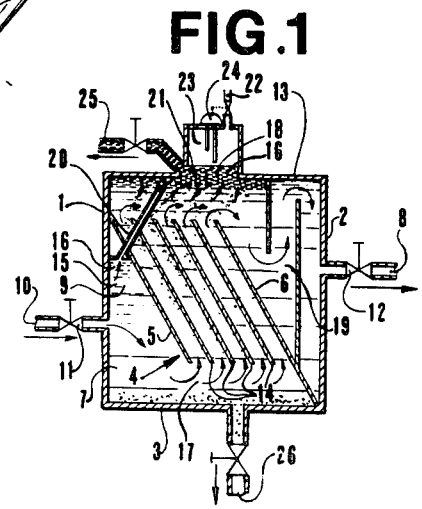
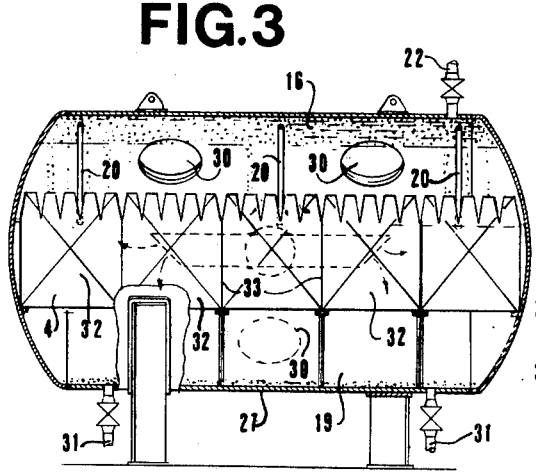
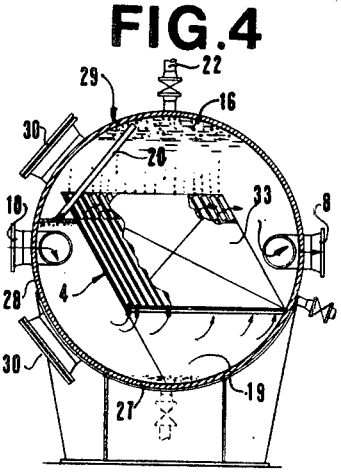

SEPARATING DEVICE

The invention relates to a separating device for separating by gravitational segregation a mixture of a carrier liquid and substances suspended therein and having a specific weight differing from that of the carrier liquid, said device comprising a separator housing, a separator arranged in said separator housing and having at least two parallel, sloping plates, the front plate nearest the inlet port for the mixture together with the front wall and the bottom of the housing enclosing a stilling space having on the top side a first collecting space intended for lightweight substances, an inlet space near the inlet side of the separator, a second collecting space near the top wall and a third collecting space enclosed by the rear wall and the hindmost plate nearest thereto and located near the outlet port for carrier liquid and comprising an outlet port for the third collecting space, whilst the stilling space, the separator and the third collecting space are arranged substantially at the same level.

Such a separating device is known from Dutch Pat. application No. 72.08503 laid open for public inspection. This known separating device can only be used at atmospheric pressure.

Object of the invention is to adapt a separating device of the kind set forth in the preamble to the use at a higher or lower pressure than the atmospheric pressure, for example, in the area of oil recovery systems such as drilling islands and production islands on the high seas.

According to the invention this is achieved by constructing the separator housing as a pressure vessel, whilst the flow resistance between the stilling space and the feeding space is low and the first and second collecting spaces communicate with one another through at least one conduit, the flow resistance of which exceeds that of the separator. By these measures the pressure difference between the first and second collecting space is maintained, whilst it is nevertheless possible to convey lighter substances from the first towards the second collecting space. The device has a compact structure and has only a limited number of inlet and outlet ducts. Since the flow resistance between the stilling space and the feeding space is kept low, the rate of flow of the liquid along the feeding path towards the separator is maintained at such a high value that even the rear portion of the separator, viewed in the direction of flow, receives an adequate amount of mixture.

The foregoing and further features of the invention will be described more fully with reference to the drawing illustrating embodiments of the invention. The drawing shows in FIG. 1 a schematic sectional view of a separating device in accordance with the invention, FIG. 2 a perspective view of a preferred embodiment, FIGS. 3 and 4 a cross-sectional view and a longitudinal sectional view of a further preferred embodiment.

The separating device according to the invention comprises a front wall 1, a bottom 3, a rear wall 2 and a top wall 13.

The separator 4 comprises at least two sloping plates, for example, a front plate 5 and a rear plate 6, between which may be located a plurality of similar, parallel plates 14 or a coalescing mass (not shown). The mixture to be dissociated is fed through the inlet port 10 into the stilling space 9 bounded by the front plate 5, the front wall 1 and the bottom 3. In the top part of the stilling space 9 is formed a collecting space 15 for readily separable, light substances 16 carried along in the mixture to be separated. On the inlet side of the separator 14 (in the drawing below the separator) is formed a feeding space 17, from where the substances are conveyed in upward direction across the separator 4. Above the separator 4 is formed a second collecting space 18. In this second collecting space 18 accumulate the light substances separated from the mixture in the separator 4. The carrier liquid 7 stripped of the contaminated substances flows from the separator 4 towards the third collecting space 19, which is bounded by the hindmost plate 6 and the rear wall 2. The purified liquid is passed through the outlet conduit 8 out of the separating device.

The pressure at the inlet port 10 is chosen to exceed that at the outlet port 8, the pressure difference being maintained by matching valves 11 and 12 respectively. According to the invention the first collecting space 15 is connected with the second collecting space 18 through at least one thin conduit 20, which does not appreciably vary the pressure difference between the two collecting spaces. Through this conduit the light substances 16 are conveyed towards the second collecting space 18, where they are added to the substances 21 already present, removed from the mixture by the separator 4. By means of a gas vent 22 the gases accumulated in the gas collecting space 23 can be removed from the device. The thickness of the gas cushion is measured by a sensor 24. The sensor 24 controls the vent means for the escape of the gas. A similar sensor is also provided in the second collecting space 18 and controls the delivery of the light substances 21 accumulated therein through the light-substance outlet 25. The heavy substances accumulate on the bottom side of the device and are conducted away through the heavy-substance outlet 26.

The embodiment shown in FIG. 2 is distinguished from that of FIG. 1 in that the housing has a cylindrical shape, which means a simple and cheap construction in regard of the requirement that the housing should constitute a pressure vessel. The embodiment of FIG. 2 is furthermore distinguished from the structure described above in that the flow resistance d between the stilling space 9 and the feeding space 17 is chosen to be very low. This is ensured by using a large flow opening, which can be achieved by disposing the bottom 3 in a sloping position. In this way a rapid inflow to the feeding space 17 is obtained so that the flow continues up to the end of the separator 4 so that even the hindmost plates receive an adequate quantity of mixture.

The embodiment shown in FIGS. 3 and 4 differs from that of FIG. 2 in that the separator 4 is arranged in the cylinder in a manner such that the direction of inclination of the plates extends in the radial direction of the cylinder and, moreover, the stream of mixture extends in a direction transverse of the cylinder. In this way a very compact structure is obtained, whilst the desired effective flow of the mixture to be separated towards the separator 4 is ensured since the bottom 27 and the front wall 28 form part of the cylinder wall 29. This results in that the resolving power per surface unit of the device is enhanced. The device has furthermore manholes 30 giving access to the device with a view to maintenance and the like. Dirt accumulated below in the third collecting space 19 is conducted away through the delivery conduit 31. The separator 4 comprises a plurality of juxtaposed packets of plates 32 separated from one another by partitions 33.

I claim:

1. A separating device for separating by gravitational segregation a mixture of a carrier liquid and substances suspended therein and having a specific weight differing from that of the carrier liquid, said device comprising a separator housing having an inlet port and an outlet port, a separator arranged in said housing and having at least two parallel, sloping plates, the front plate nearest the inlet port for the mixture together with the front wall and the bottom of the housing enclosing a stilling space having on the top side a first collecting space intended for light-weight substances, a feeding space near the inlet side of the separator, a second collecting space near the top wall and a third collecting space enclosed by the rear wall and the hindmost plate nearest thereto and located near the outlet port for the carrier liquid, in which the stilling space, the separator and the third collecting space are disposed at substantially the same level, characterized in that the separator housing is constructed as a pressure vessel, the flow resistance between the stilling space and the feeding space is low and the first and second collecting spaces communicate with one another through at least one conduit in parallel with said separator, the flow resistance of which exceeds that of the separator, and including means for selectively discharging lighter substances from said second collecting space, means for selectively discharging heavier substances from said feeding space, and means for selectively discharging gases from said second collecting space.

2. A separating device as claimed in claim 1, characterized in that the bottom and the front wall form part of a cylinder wall.

3. A separating device for separating by gravitational segregation a mixture of a carrier liquid and substances suspended therein and having a specific weight differing from that of the carrier liquid, comprising in combination:

a pressure vessel having inlet means on one side thereof for introducing the carrier liquid with suspended substance therein into the vessel and, on the opposite side thereof, outlet means for discharging the carrier liquid, at least one of said inlet and outlet means including valve means for establishing and maintaining a selected difference in pressure between the liquid as it enters the vessel and the liquid as it leaves the vessel;

separator means located in said vessel between said inlet and outlet means for passing the carrier liquid therethrough while coalescing substances lighter than the carrier liquid, said separator means comprising a plurality of spaced, sloping plates defining, at the bottom and top ends thereof, an inlet and an outlet respectively, said inlet of the separator means being disposed below the level of said inlet means but spaced above the bottom of the vessel to define a feeding space communicating with said inlet means, said separator means presenting a predetermined resistance to flow therethrough, said outlet of the separator means being disposed above the level of said inlet means but being spaced below the top of said vessel to define a stilling space between said inlet means and said separator means forming, at a region immediately above said inlet means, a first collecting space for lighter substances and to define between said inlet and the top of said vessel a second collecting space for lighter substances;

said outlet means being disposed below the level of said outlet of the separator means within a third collecting space defined between said separator means and said outlet means;

conduit means communicating said first and second collecting spaces in parallel with said separator means for flowing lighter material collected in said first collector space to said second collector space, said conduit means having a flow resistance which is greater than that of said separator means;

means for selectively discharging heavier substances from said feeding space;

means for selectively discharging gases from said second collecting space; and means for selectively discharging lighter substances from said second collecting space.

4. A separating device as defined in claim 3 wherein the bottom wall of said vessel below said inlet of the separator means slopes upwardly towards said separator means in that direction away from said inlet means.

5. A separating device as defined in claim 4 wherein said vessel is generally cylindrical and the plates of said separator means extend generally parallel to a longitudinal plane through the cylindrical vessel.

* * * * *